United States Patent
Vito

(10) Patent No.: US 6,516,642 B1
(45) Date of Patent: Feb. 11, 2003

(54) COLUMN SECURITY DEVICE

(76) Inventor: Robert A. Vito, 1434 Sugartown Rd., Berwyn, PA (US) 19312

( * ) Notice: Subject to any disclaimer, the term of this patent is extended or adjusted under 35 U.S.C. 154(b) by 0 days.

(21) Appl. No.: 10/010,532

(22) Filed: Dec. 7, 2001

(51) Int. Cl.$^7$ .............................................. B60R 25/02
(52) U.S. Cl. ................................ 70/209; 70/226; 70/237
(58) Field of Search ............................. 70/14, 18, 19, 70/237, 238, 225, 226, 209

(56) References Cited

U.S. PATENT DOCUMENTS

| | | | |
|---|---|---|---|
| 2,716,336 A | 8/1955 | Ross | 70/238 |
| 3,190,090 A | 6/1965 | Zaidener | 70/203 |
| 3,690,131 A | 9/1972 | Davis | 70/203 |
| 3,898,823 A | 8/1975 | Ludeman | 70/200 |
| 4,696,172 A | 9/1987 | Farrow | 70/238 |
| 4,699,238 A | 10/1987 | Tamir | 180/287 |
| 4,779,435 A | 10/1988 | Farrow | 70/238 |
| 5,259,222 A | 11/1993 | Jang | 70/209 |
| 5,267,458 A | 12/1993 | Heh | 70/238 |
| 5,329,793 A | 7/1994 | Chen | 70/209 |
| 5,488,844 A | 2/1996 | Winner | 70/18 |
| 5,513,506 A | 5/1996 | Ricalde | 70/209 |
| D372,418 S | 8/1996 | Winner | D8/346 |
| 5,598,142 A | 1/1997 | Winner, Jr. | 340/438 |
| 5,600,979 A | 2/1997 | Winner et al. | 70/252 |
| 5,604,384 A | 2/1997 | Carlo et al. | 307/10.5 |
| 5,613,383 A | 3/1997 | Banez | 70/209 |
| 5,635,899 A | 6/1997 | Carlo et al. | 340/426 |
| 5,653,133 A | 8/1997 | Passantino | 70/238 |
| D383,372 S | 9/1997 | Winner | D8/346 |
| 5,671,620 A | 9/1997 | Carvey et al. | 70/238 |
| 5,673,575 A | 10/1997 | Carlo et al. | 70/209 |
| 5,677,668 A | 10/1997 | Winner, Jr. | 340/438 |
| 5,704,233 A | 1/1998 | Farshad | 70/238 |
| 5,709,113 A | 1/1998 | Godfrey | 70/233 |
| D391,142 S | 2/1998 | Winner | D8/333 |
| 5,730,008 A | 3/1998 | Case et al. | 70/18 |
| 5,735,149 A | 4/1998 | Winner, Jr. | 70/209 |
| 5,755,123 A | 5/1998 | Winner, Jr. | 70/209 |
| 5,765,415 A | 6/1998 | Savinsky | 70/209 |
| 5,778,709 A | 7/1998 | Hsu | 70/209 |
| D398,830 S | 9/1998 | Winner | D8/333 |
| 5,826,448 A | 10/1998 | Graham | 70/209 |
| 5,836,186 A | 11/1998 | Winner, Jr. | 70/209 |
| 5,842,361 A | 12/1998 | Banez | 70/209 |
| 5,855,128 A | 1/1999 | Voiculescu | 70/209 |
| 5,865,044 A | 2/1999 | Wu | 70/209 |
| 5,870,912 A | 2/1999 | Vito | 70/202 |
| 5,881,587 A | 3/1999 | Vito | 70/202 |
| 5,887,464 A | 3/1999 | Perez | 70/209 |
| 5,901,586 A | 5/1999 | Hale | 70/18 |
| 5,906,121 A | 5/1999 | Mankarious | 70/199 |
| 5,921,115 A | 7/1999 | Winner | 70/18 |
| 5,996,721 A | 12/1999 | Winner | 70/209 X |
| 6,029,483 A | 2/2000 | Daniels | 70/199 |
| 6,089,055 A | 7/2000 | Vito | 70/202 |
| 6,116,065 A | 9/2000 | Hale | 70/200 |
| 6,131,426 A | 10/2000 | Tarnofsky | 70/209 |
| 6,192,724 B1 | 2/2001 | Vito | 70/202 |
| 6,202,456 B1 | 3/2001 | Vickers | 70/202 |
| 6,212,920 B1 | 4/2001 | Winner | 70/38 C |
| 6,223,568 B1 | 5/2001 | Wu | 70/209 |
| 6,223,569 B1 | 5/2001 | Wu | 70/209 |
| 6,230,527 B1 | 5/2001 | Wu | 70/209 |
| 6,240,753 B1 | 6/2001 | Wu | 70/209 |

*Primary Examiner*—Suzanne Dino Barrett
(74) *Attorney, Agent, or Firm*—Volpe and Koenig, P.C.

(57) ABSTRACT

An anti-theft device for securing a steering wheel of a vehicle. The anti-theft device includes at least one bracing member adapted to be positioned over a portion of a steering column and over a portion of the steering wheel. A column engaging member is detachably engageable with the bracing member to, in combination with the bracing member, form a linkage adapted to substantially surround the steering column in an installed configuration. A locking mechanism is adapted to detachably lock the anti-theft device in the installed configuration.

23 Claims, 8 Drawing Sheets

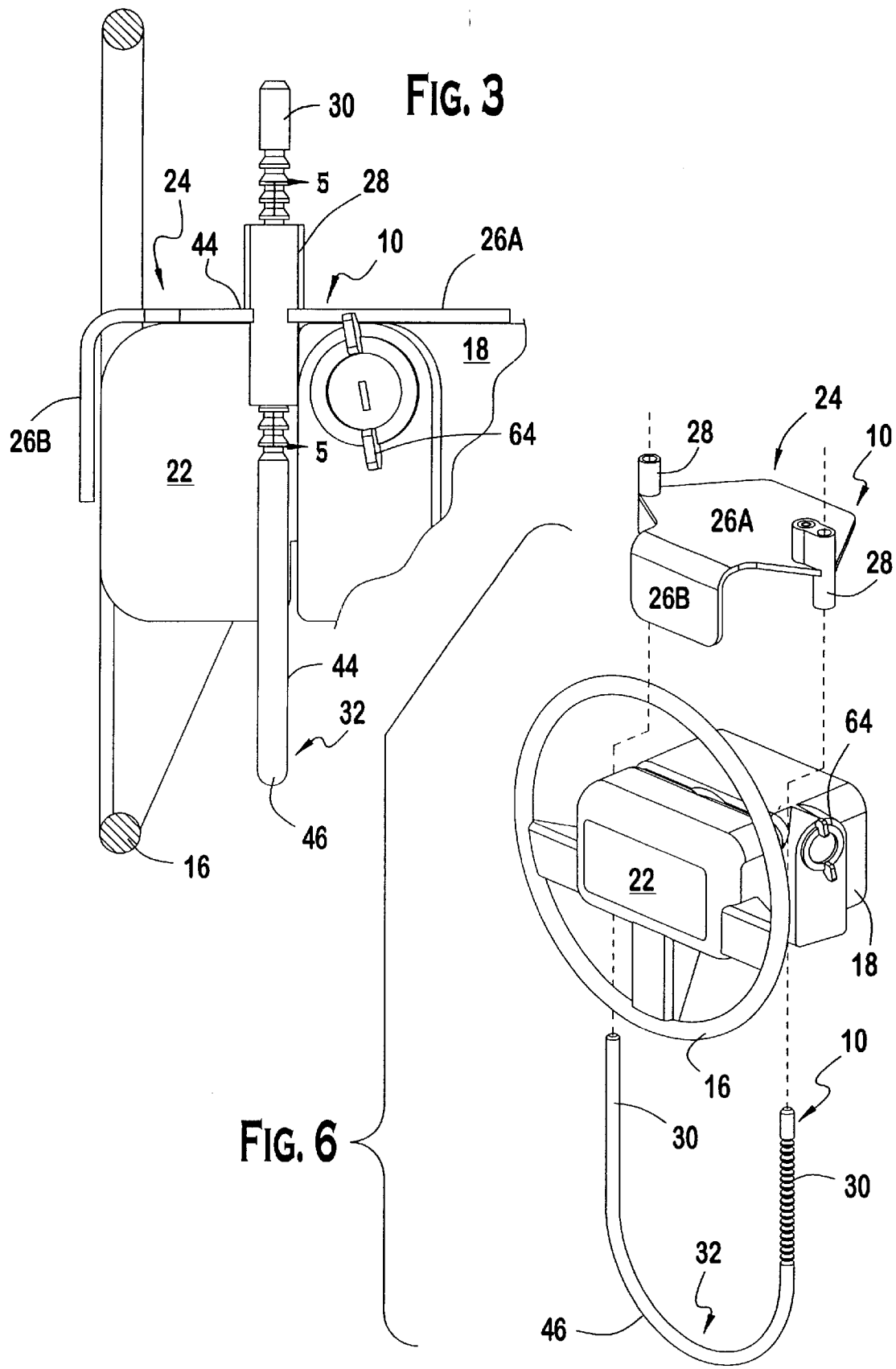

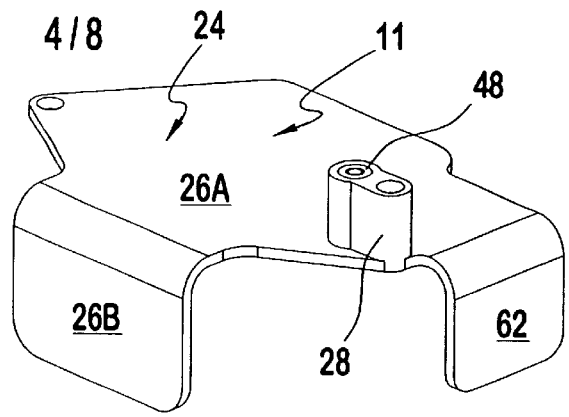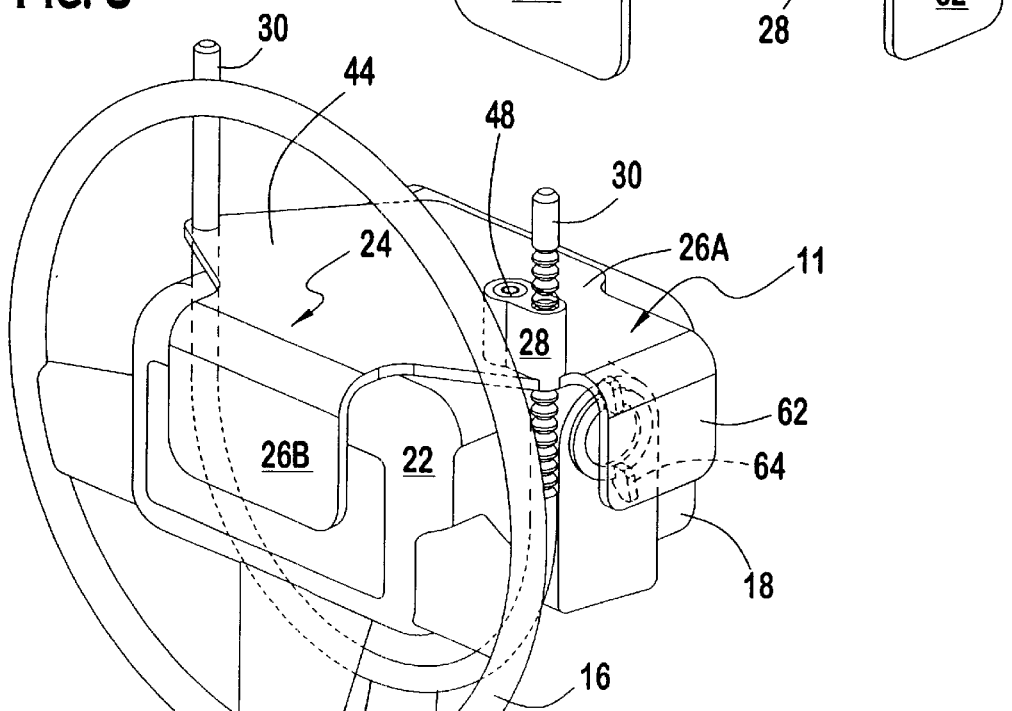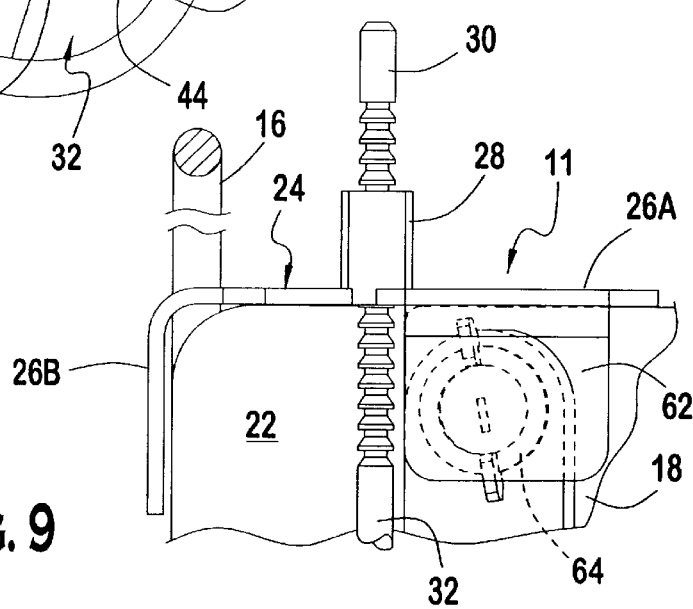

COLUMN SECURITY DEVICE

BACKGROUND

The present invention is directed to vehicle anti-theft devices and, more specifically, to vehicle anti-theft devices that secure the position of a steering wheel relative to a steering column of a vehicle.

While vehicle anti-theft devices are known in the prior art, most such devices provide insufficient protection or are too complex to readily install. Many such prior art devices include long club-like members designed to limit rotation of the steering wheel. Unfortunately, such long club-like members make it difficult to remove and store such anti-theft devices in the back seat of a vehicle while sitting in the driver's seat. Additionally, airbags are often unprotected by prior art anti-theft devices.

Clearly, what is needed is a heavy duty, compact, easy to install and easy to store vehicle anti-theft device that is capable of securing the position of a steering wheel relative to a steering column. Also needed is such an anti-theft device that is also capable of protecting an airbag.

SUMMARY

One embodiment of the present invention is directed to an anti-theft device for securing a steering wheel of a vehicle. The steering wheel is rotatably mounted on a steering column. The steering wheel has a hub and front side, facing generally away from the steering column. The anti-theft device includes at least one bracing member adapted to be positioned over a portion of the steering column and over a portion of the steering wheel. The at least one bracing member includes first and second plates. The first plate is adapted to cover the portion of the steering column and a first portion of the hub. The second plate has an edge located along the first plate and is adapted to cover a second portion of the hub along the front side of the steering wheel. A column engaging member is detachably engagable with the first plate to, in combination with the first plate, form a linkage adapted to substantially surround the steering column in an installed configuration. A locking mechanism is adapted to detachably lock the anti-theft device in the installed configuration.

In another aspect, the present invention is directed to an anti-theft device for securing a steering wheel of a vehicle. The steering wheel is rotatably mounted on a steering column. The steering wheel has a hub and front side, facing generally away from the steering column. The anti-theft device includes at least one bracing member adapted to be positioned over a portion of the steering column and over a portion of the steering wheel. The at least one bracing member includes first and second pluralities of frame members. The first plurality of frame members includes a set of generally parallel tubes with a single transverse tube connecting the first set of generally parallel tubes which are adapted to cover the portion of the steering column and a first portion of the hub. The set of generally parallel tubes each has an end positioned proximate to the first portion of the hub. The second plurality of frame members is positioned end-to-end to form a single hub linkage. The single hub linkage has two linkage ends each located on a separate one of the ends of the set of parallel tubes. The single hub page is positionable to cover a second portion of the hub along the front side of the steering wheel. A column engaging member is deta chably engagable with the first set of generally parallel tubes to, in combination with the first set of generally parallel tubes, form a linkage adapted to substantially surround the steering column in an installed configuration. A locking mechanism is adapted to detachably lock the anti-theft device in the installed configuration.

In another aspect, the present invention is directed to a combination anti-theft device and steering wheel of a vehicle. The steering wheel is rotatably mounted on a steering column. The anti-theft device is adapted to detachably secure the steering wheel. The steering wheel has a hub and a front side, facing generally away from the steering column. The combination includes the steering wheel and the steering column. At least one bracing member is detachably positioned over a portion of the steering column and over a portion of the steering wheel. The at least one bracing member includes first and second plates. The first plate is positionable to cover the portion of the steering column and a first portion of the hub. The second plate has an edge located along the first plate and is positionable to cover a second portion of the hub along the front side of the steering wheel. A column engaging member detachably engages with the first plate to, in combination with the first plate, form a linkage adapted to substantially surround the steering column in an installed configuration. A locking mechanism is adapted to detachably lock the anti-theft device in the installed configuration.

In another aspect, the present invention is directed to a combination anti-theft device and steering wheel for a vehicle. The steering wheel is rotatably mounted on a steering column. The anti-theft device is adapted to secure the steering wheel. The steering wheel has a hub and a front side, facing generally away from the steering column. The combination includes the steering wheel and the steering column. At least one bracing member is positionable over a portion of the steering column and over a portion of the steering wheel. The at least one bracing member includes first and second pluralities of frame members. The first plurality of frame members includes a set of generally parallel tubes with a single transverse tube connecting the first set of generally parallel tubes which are positionable to cover this portion of the steering column and the first portion of the hub. The set of generally parallel tubes each has an end positioned proximate to the first portion of the hub. The second plurality of frame members is positioned end-to-end to form a single hub linkage. The single hub linkage has two linkage ends each located on a separate one of the ends of the set of parallel tubes. The single hub linkage is positionable to cover a second portion of the hub along the front side of the steering wheel. A column engaging member is detachably engagable with the first set of generally parallel tubes to, in combination with the first set of generally parallel tubes, form a linkage adapted to substantially surround the steering column in an installed configuration.

BRIEF DESCRIPTION OF THE SEVERAL VIEWS OF THE DRAWINGS

The foregoing summary, as well as the following detailed description of the preferred embodiments of the present invention, will be better understood when read in conjunction with the appended drawings. For the purpose of illustrating the invention, there is shown in the drawings embodiments which are presently preferred. It is understood, however, that the invention is not limited to the precise arrangements and instrumentalities shown. In the drawings:

FIG. 3 is a left side elevational view (with a portion of the steering wheel broken away) of the anti-theft device of FIG. 1;

FIG. 6 is an exploded perspective view of the anti-theft device of FIG. 1;

FIG. 7 is a perspective view of a second preferred embodiment of an anti-theft device according to the present invention;

FIG. 8 is a perspective partial view of the anti-theft device of FIG. 7 installed on the steering wheel and steering column of the vehicle;

FIG. 9 is a partial left side elevational view (with a portion of the steering wheel broken away) of the anti-theft device of FIG. 8;

DETAILED DESCRIPTION OF THE PREFERRED EMBODIMENTS

Figure 1:
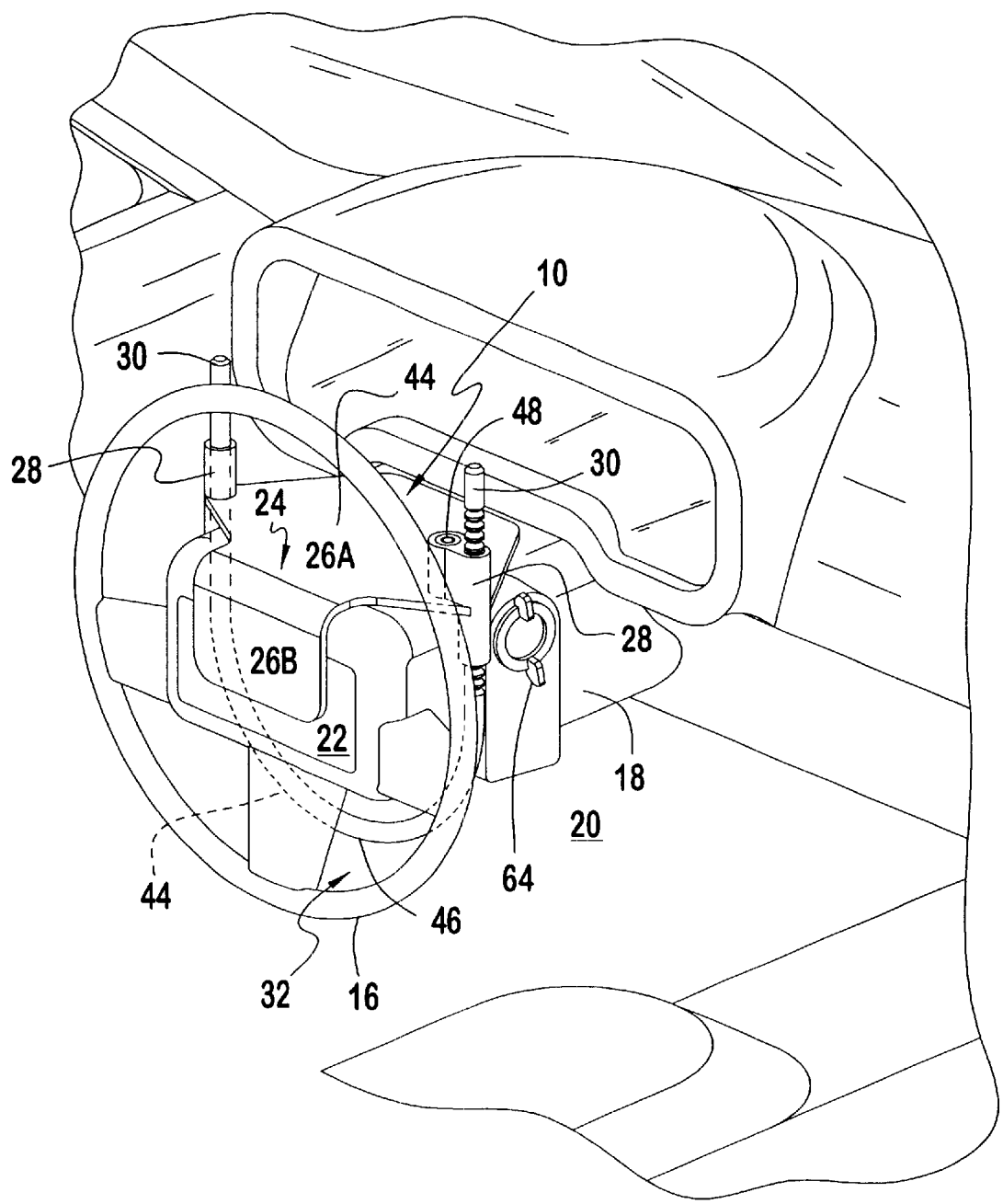
FIG. 1 is a perspective view of a first preferred embodiment of an anti-theft device according to the present invention illustrating the device installed in a vehicle.

Certain terminology is used in the following description for convenience only and is not limiting. The words "right," "left," "top," and "bottom" designate directions in the drawings to which reference is made. The words "inwardly" and "outwardly" refer to the directions toward and away from, respectively, the geometric center of the anti-theft device and designated parts thereof. The word "vehicle," as used in the claims and specification, means "a car, truck, golf cart, boat, or any other transportation device having a steering wheel and a steering column, or its equivalent." The terminology includes the words above specifically mentioned, derivatives thereof, and words of similar import. Additionally, the words "a" and "one" are defined as including one or more of the referenced item unless specifically stated otherwise.

Referring to FIGS. 1–16, wherein like numerals indicate like elements throughout, there are shown five preferred embodiments of an anti-theft device according to the present invention, generally designated 10–14, respectively. Briefly stated, the anti-theft device 10–14 prevents the rotation of the steering wheel 16 relative to the steering column 18 to secure a vehicle 20.

It is preferred, but not necessary, that the anti-theft device 10–14 be formed of a rigid, strong, high-impact resistant material, such as stainless steel. However, the anti-theft device 10–14 can also be formed from other suitable materials such as steel, titanium, suitable reinforced polymers, and alloys without departing from the scope of the present invention. Preferably, an outer surface of the anti-theft device 10–14 is coated with a brightly colored paint or coating, such as a fluorescent orange colored paint or vinyl coating, so that the anti-theft device 10–14 is prominently visible and noticeable when installed on the vehicle 20.

Figure 11:
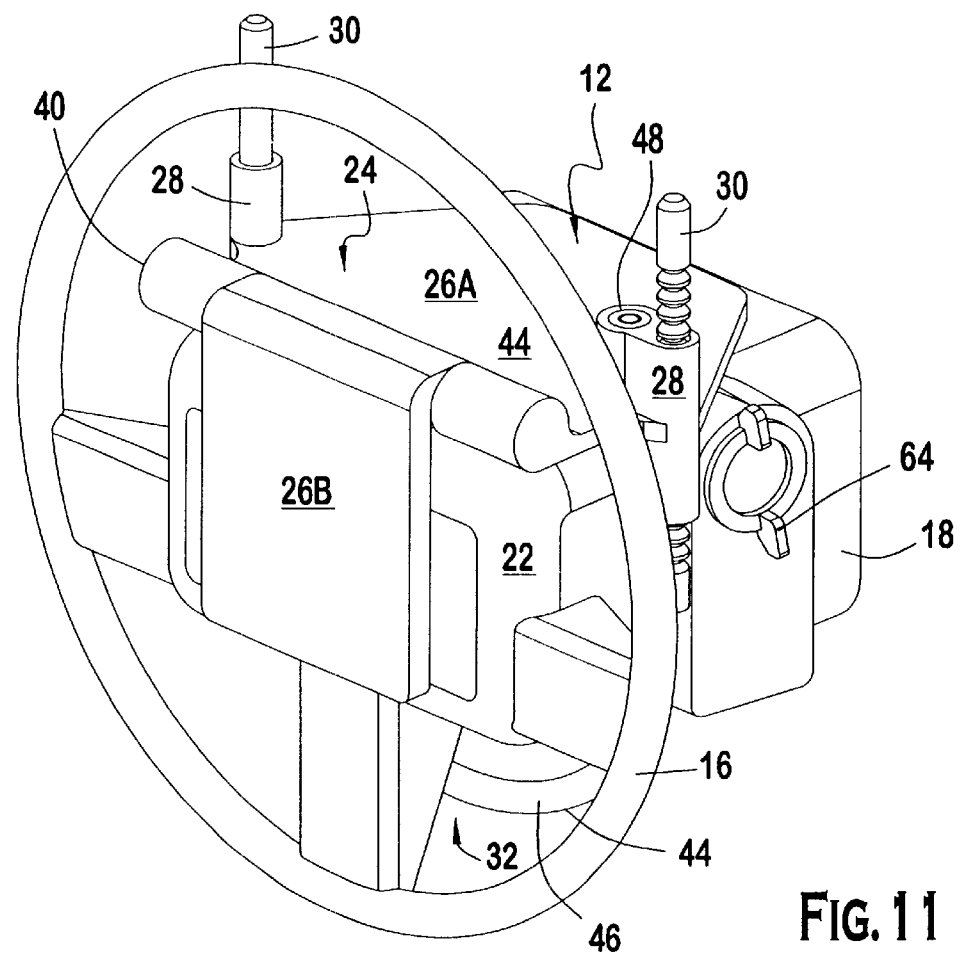
FIG. 11 is a perspective view of the anti-theft device of FIG. 10 installed on the steering wheel and steering column of the vehicle.
Figure 14:
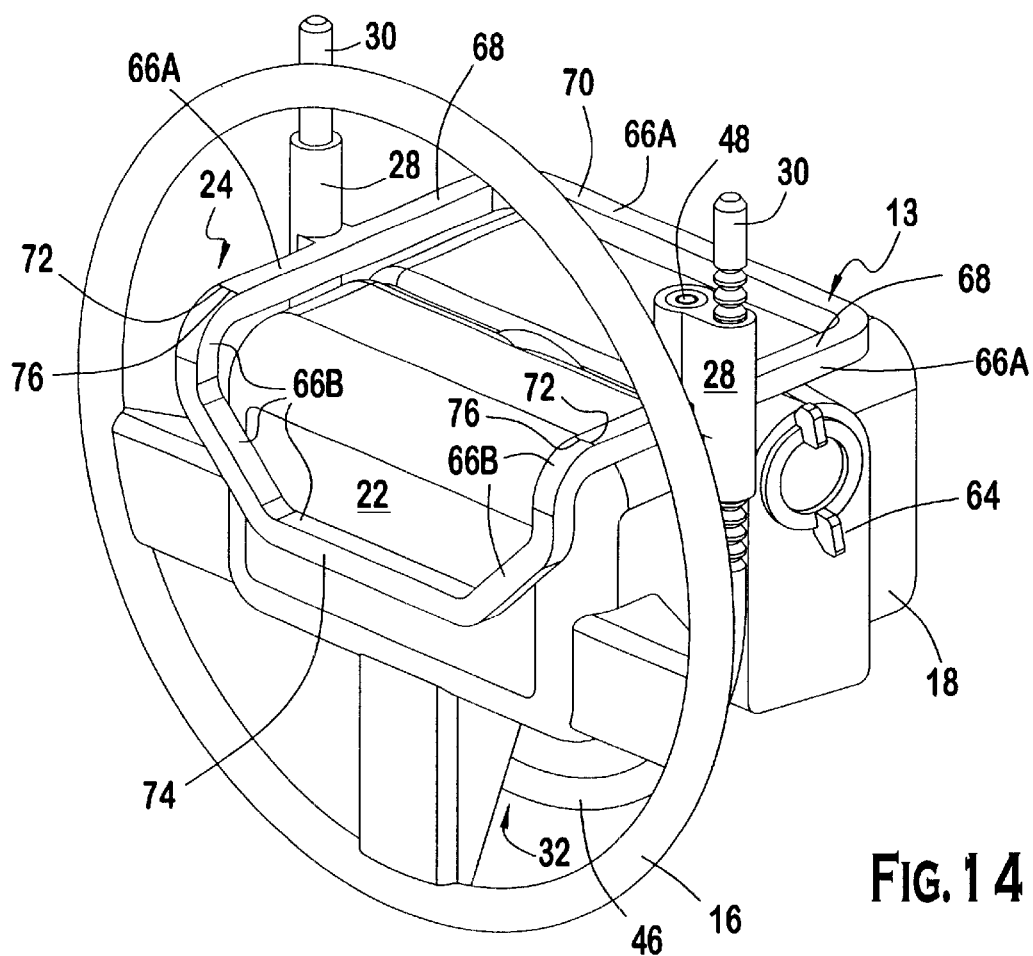
FIG. 14 is a perspective view of the anti-theft device of FIG. 13 installed on the steering wheel and steering column of the vehicle.
Figure 16:
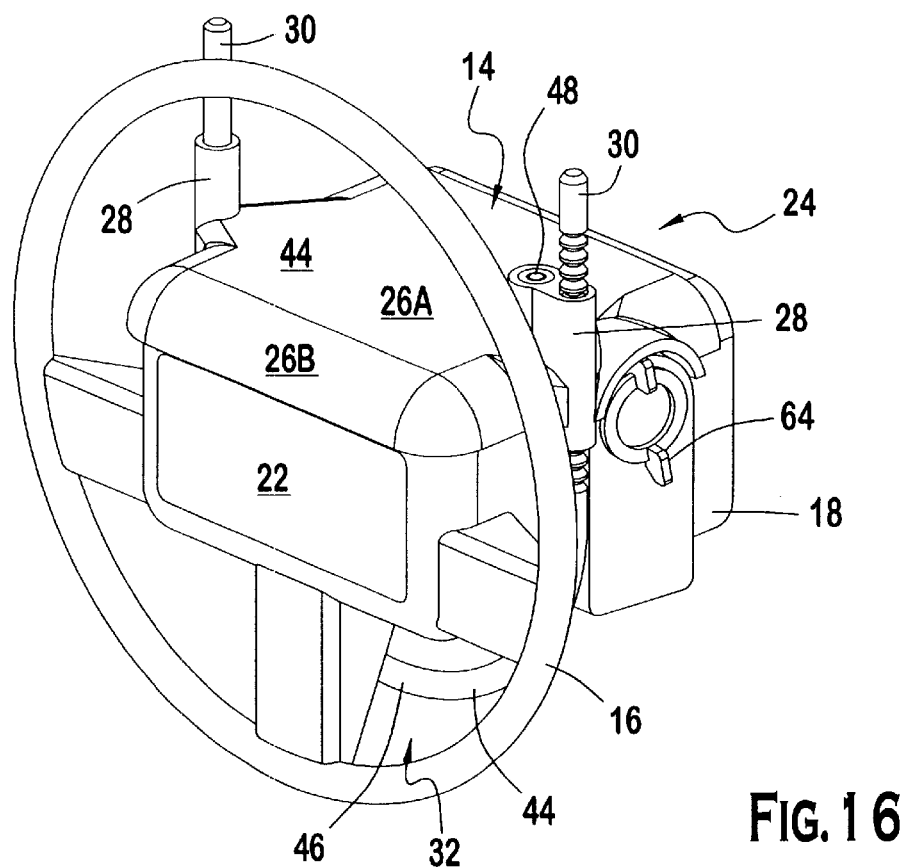
FIG. 16 is a perspective view of the anti-theft device of FIG. 15 installed on the steering wheel and steering column of the vehicle.

As best shown in FIGS. 11,14, and 16, the anti-theft device 10–14 is adapted to secure a steering wheel 16 of a vehicle 20. While the preferred steering wheel 16 has a generally circular shape, those of ordinary skill in the art will appreciate from this disclosure that the steering wheel can have any shape, including an irregular shape, without departing from the present invention. The steering wheel is rotatably mounted on the steering column 18 (or steering column equivalent) of the vehicle 20. The steering wheel 16 has a hub 22 (or a hub equivalent) and a front side which faces generally away from the steering column 18.

As best shown in FIGS. 3,9,12, and 16, the anti-theft device 10–14 includes at least one bracing member 24 that is adapted to be positioned over a portion of the steering column 18 and over a portion of the steering wheel 16. It is preferable, but not necessary, that the bracing member 24 forms a generally L-shaped member when viewed from a side elevational orientation.

The first through third and fifth embodiments of the anti-theft device 10–12, 14 include first and second plates 26A, 26B. The first plate 26A is adapted to cover the portion of the steering column 18 and a first portion of the hub 22. The first portion of the hub 22 is preferably the top portion of the hub 22. The first plate 26A, preferably includes a tube 28 defining a chute for receiving at least one connecting part 30 of the column engaging member 32 (Rer described below) within the tube 28. While it is preferred that the tube 28 be oriented planar perpendicular relative to the first plate 26A, those of ordinary skill in the art will appreciate that the tubes 28 can be askew from perpendicular relative to the first plate 26A without departing from the scope of the present invention.

Figure 15:
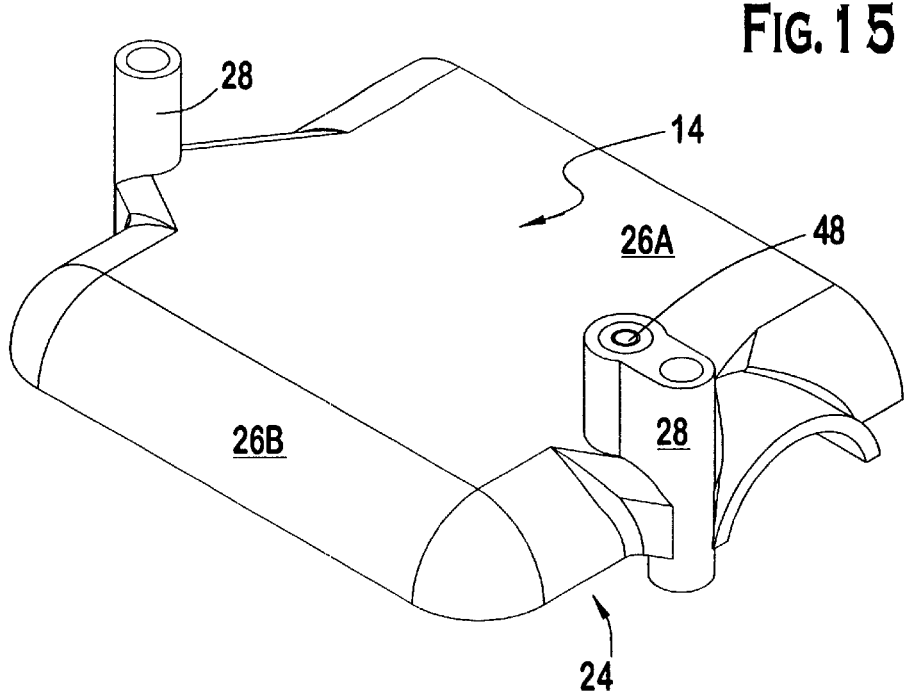
FIG. 15 is a perspective view of a fifth preferred embodiment of an anti-theft device according to the present invention.

Referring to FIGS. 15 and 16, the anti-theft device 14 can have a curved first plate 26A to complement the portion of the outer surface of the steering column 18 covered thereby. Thus, allowing the anti-theft device 14 to be customized for particular vehicles.

Figure 12:
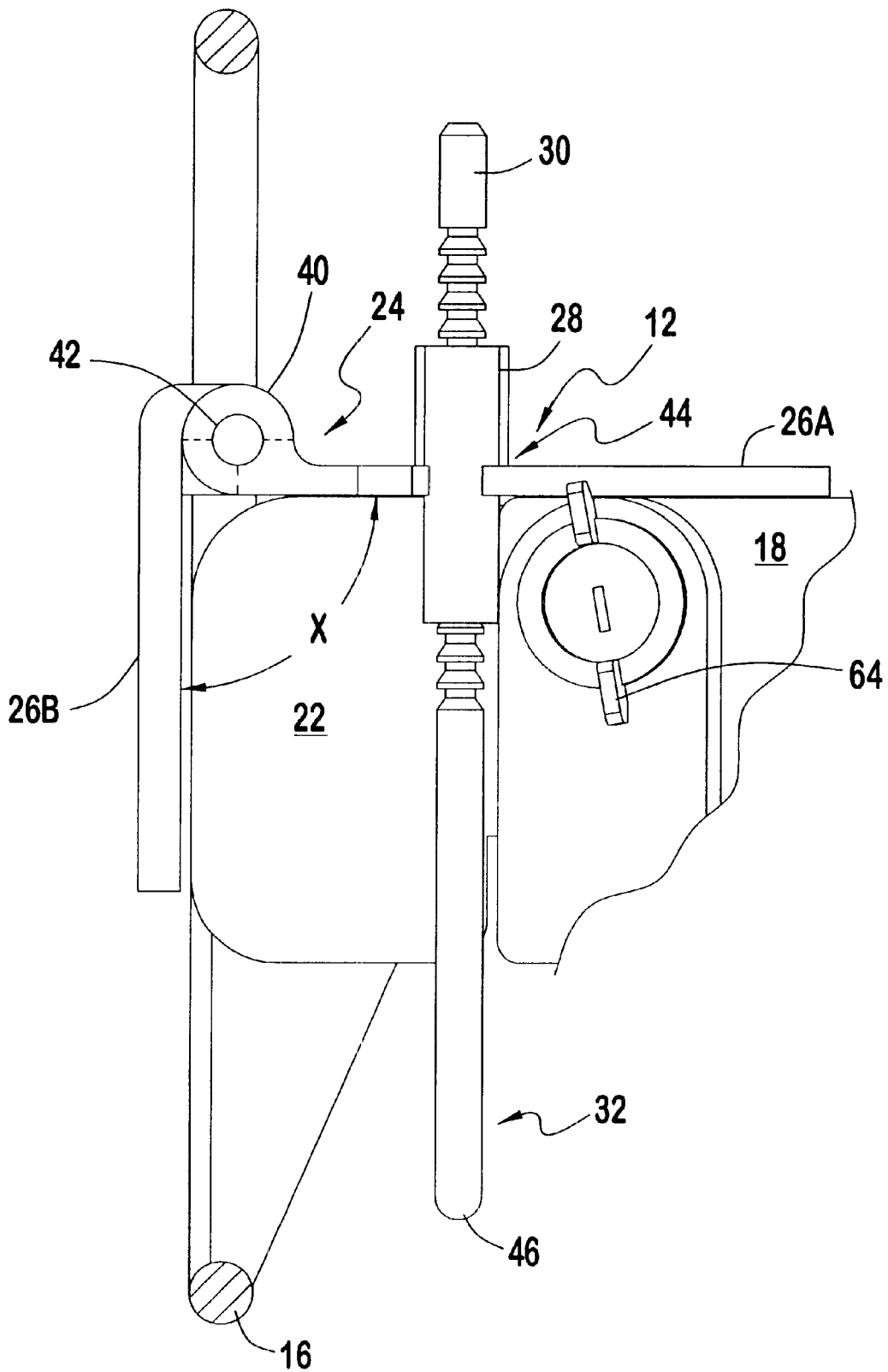
FIG. 12 is a left side elevational view (with a portion of the steering wheel broken away) of the anti-theft device of FIG. 11.

Referring again to FIGS. 11–2, 15, and 16, the second plate 26B has an edge located along the first plate 26A and is adapted to cover a second portion of the hub 22 along the front side of the steering wheel 18. As best shown in FIG. 12, the second plate 26B can cover a second portion (i.e., a front portion) of the hub 22 without contacting the hub 22. Similarly, those of ordinary skill in the art will appreciate that the first plate 26A can cover the hub 22 and the steering column 18 even if a small gap exists therebetween.

Figure 2:
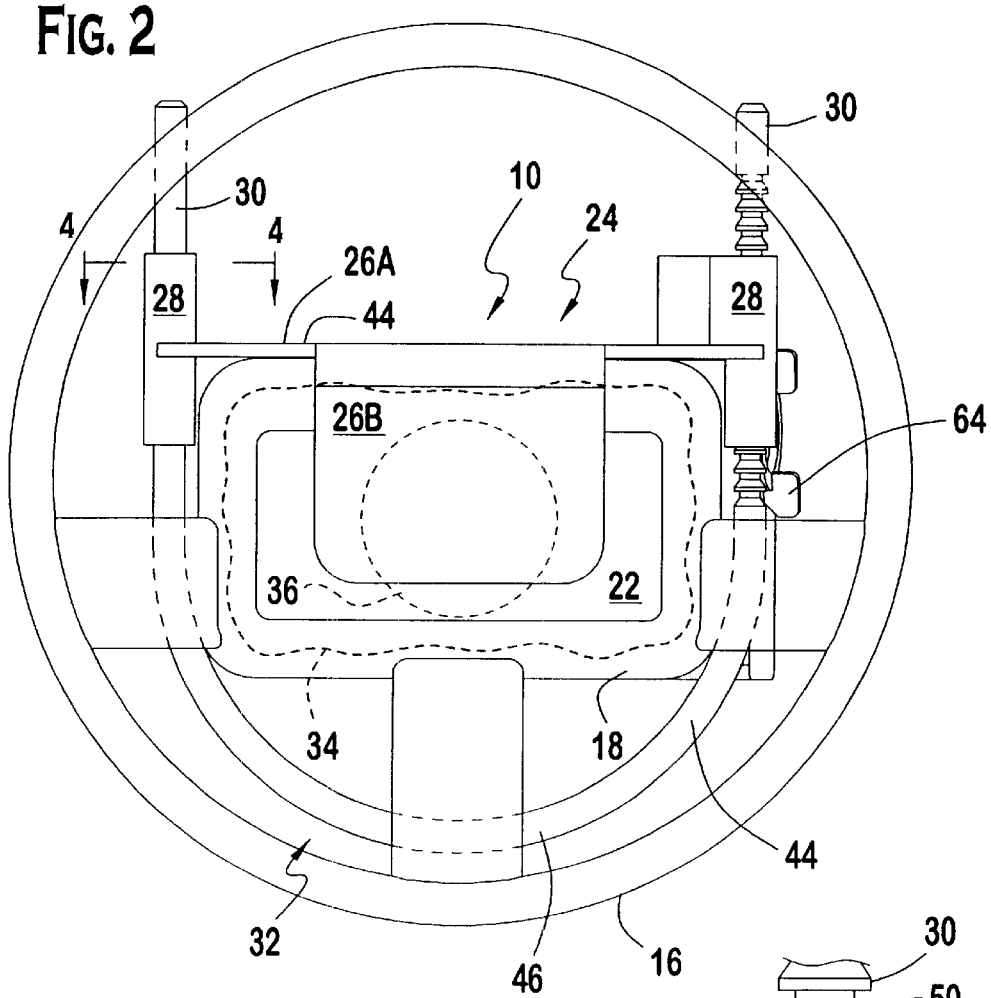
FIG. 2 is a front elevational view of the anti-theft device of FIG. 1.
Figure 4:
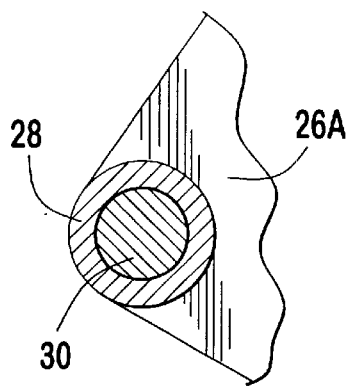
FIG. 4 is a cross-sectional view of the anti-theft device of FIG. 2 as taken along the line 4—4 of FIG. 2.

Referring to FIG. 2, the second plate 26B can be designed to cover an airbag 34 contained within the steering wheel 16 without departing from the present invention. The airbag 34 may be powered by a gas canister 36 or by any other known means for powering an airbag 34.

Referring to FIGS. 15 and 16, the second plate 26B can be contoured to precisely fit over a front portion of the hub 22 of the steering wheel 16. Referring to the first through third embodiments of the anti-theft device 10–12 shown in FIGS. 1–12, the second plate 26B preferably has a generally rectangular shape. Those of ordinary skill in the art will appreciate from this disclosure that the first and second plates 26A, 26B, can be perforated, irregularly shaped or the like without departing from the scope of the present invention.

Figure 10:
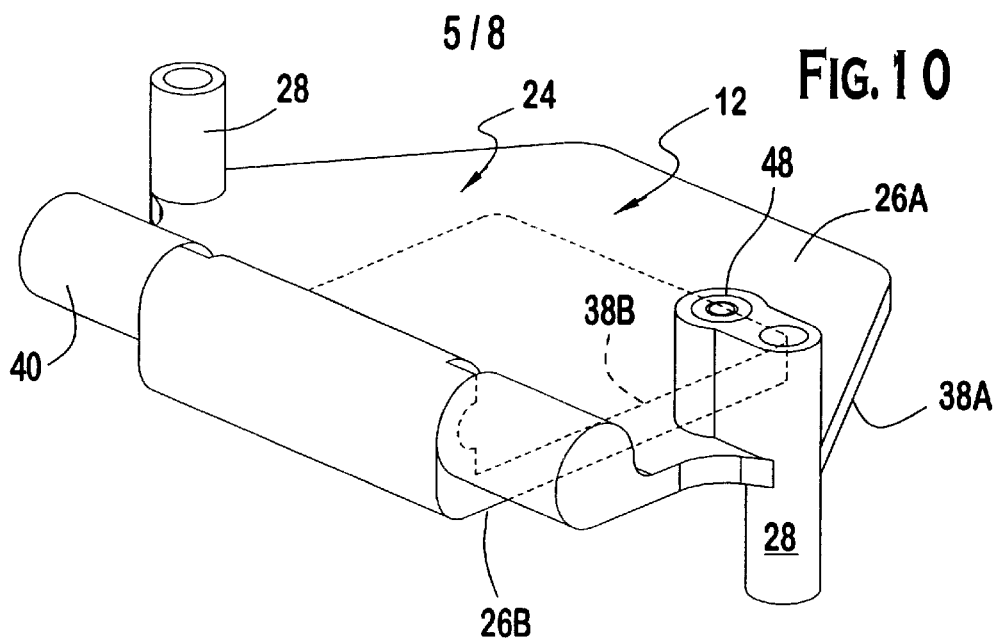
FIG. 10 is a perspective view of a third preferred embodiment of an anti-theft device according to the present invention.

Referring to FIGS. 10–12 the anti-theft device 12 can have a second plate 22B that is hinged to the first plate 26A such that the first and second plates 26A, 26B can be placed in a storage position (shown in FIG. 10) with the first and second plates 26A, 26B each having a separate major surface 38A, 38B adjacent to each other. The capability of folding the anti-theft device 12 such that the second plate 26B is generally planar parallel to the first plate 26A allows for the compact storage of the anti-theft device 12. This simplifies shipping of the anti-theft device 12 as well as the storage of the anti-theft device 12 in a vehicle. For example, the folded anti-theft device 12 can be inserted inside a pouch that is hung from the back of a passenger seat or that is stored underneath the seat. The term "adjacent" as used in the claims to describe the position of the separate major surfaces 38A, 38B of the first and second plates 26A, 26B is defined as including first and second plates that are slightly spaced from each other yet still generally planar parallel (i.e., within about thirty degrees of planar parallel).

The first and second plates 26A, 26B of the third embodiment of the anti-theft device 12 are preferably connected by a rotation limiting hinge 40 that prevents the second plate 26A from being rotated from the storage position through an arc (denoted "X" in FIG. 12) of more than about ninety through one hundred twenty (90–120) degrees. Those of ordinary skill in the art will appreciate from this disclosure that the rotation limiting hinge 40 can be moved through an arc "X" of between approximately 60 degrees and approximately a 140 degrees without departing from the present invention. As shown in FIG. 12, the rotation limiting hinge 40 preferably includes a torsion spring 42, or an equivalent biasing element, to bias the second plate 24B into the storage position (shown in FIG. 10).

As best shown in FIGS. 2, 6, and 12, the column engaging member 32 is detachably engageable with the first plate 26A to, in combination with the first plate, form a linkage 44 adapted to substantially surround the steering column 18 in an installed configuration (shown in FIGS. 1, 2, 3, 8, 9, 11, 12, and 16). The use of the term "surround" to describe the linkage's 44 orientation relative to the steering column 18, as used in the claims and the corresponding portions of the specification, is defined to mean extending along a path substantially around the steering column 18 as opposed to meaning that the column engaging member 32 and the first plate 26A encase the entire steering column 18. While the embodiments shown in the drawings illustrate the linkage 44 completely surrounding one circumference of the steering column 18, those of ordinary skill in the art will appreciate from this disclosure that a gap can exist between the first plate 26A and one end of the column engaging member 32 without departing from the scope of the present invention.

The column engaging member 32 preferably includes the at least one connecting part 30 which is adapted to be detachably securable to the first plate 26A. The column engaging member 32 preferably also includes a transverse part 46 which is adapted to overlay a portion of the steering column 32 generally opposite from the first plate 26A. While the preferred embodiment of the column engagement member 32 is shown as being U-shaped, those of ordinary skill in the art will appreciate that the column engaging member 32 can be otherwise shaped or configured to conform with a particular steering column 18 without departing from the present invention.

Figure 5:
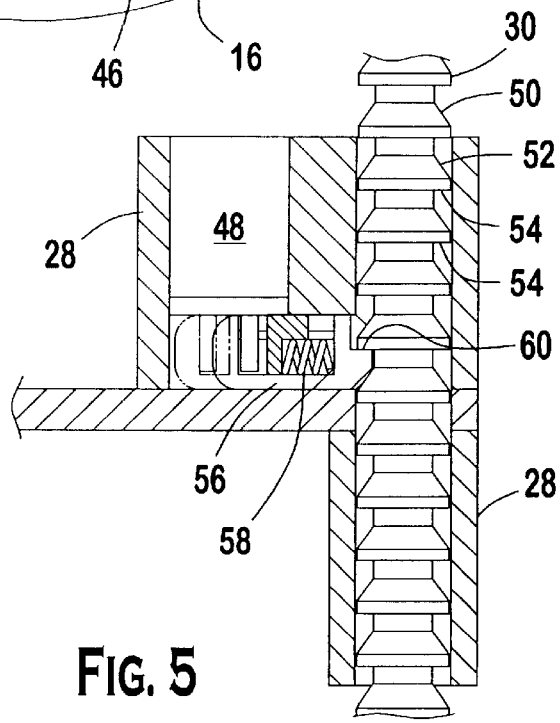
FIG. 5 is a cross-sectional view of the anti-theft device of FIG. 3 as taken along the line 5—5 of FIG. 3 illustrating details of a locking mechanism.

As best shown in FIGS. 5 and 15, a locking mechanism 48 is adapted to detachably lock the anti-theft device 10–14 in the installed configuration. The connecting part 30 that is secured by the locking mechanism 48 preferably has ratchets 50 located thereon. The ratchets preferably include downwardly beveled surfaces 52 and flat bottom surfaces 54. Locking mechanism 48 includes a sliding lock mechanism 56 that engages the ratchets 50 to prevent the column engaging member 32 from being pulled downwardly out of the tube 28. The sliding lock mechanism 56 is biased by a biasing member 58, such as a spring, into the locked position, (shown in solid lines for component 56 in FIG. 5). When a key or other activation mechanism is used to activate the locking mechanism 48, the sliding block mechanism 56 is moved leftwardly into an unlocked position (shown by phantom lines for component 56 in FIG. 5) which disengages a lip 60 of the sliding lock mechanism 56 from the ratchets 50 to allow the column engaging member 32 to be downwardly removed from the tube 28. While one preferred embodiment of a locking mechanism has been shown in the drawings, those of ordinary skill in the art will appreciate from this disclosure that any known locking mechanism can be used to secure the column engaging member 32 to the bracing member 24 without departing from the scope of the present invention.

It is preferred that the locking mechanism 54 be disposed proximate to the tube 28 to detachably secure the connecting part within the tube 28. Those of ordinary skill in the art will appreciate from this disclosure that the locking mechanism 48 can be a separate component that is slid over the connecting part 30 of the column engaging member 32 and that is then slid downwardly into contact with the top surface of the bracing member 24 after the column engaging member 32 has been engaged with the bracing member 24. This further allows for the compact storage of the anti-theft device 10–14 when not in use. Additionally, multiple locking mechanisms 48 can be used with one anti-theft device 10–14 without departing from the scope of the present invention.

Referring to the second preferred embodiment of the anti-theft device 11, as shown in FIGS. 7–9, the anti-theft device 11 may include a third plate 62 located on the first plate 26A and adapted to extend generally perpendicularly therefrom (in the downwardly direction as viewed in the drawing) to cover an ignition key receptacle 64. The term "adapted to extend generally perpendicularly" is defined as meaning having a portion which extends generally perpendicularly. Thus, the third plate 62 shown in FIG. 7 which has a curved upper portion to connect to the first plate 26A is properly considered as extending generally perpendicularly from the first plate. While only the second embodiment of the anti-theft device 11 is shown as having a third plate 62, those of ordinary skill in the art will appreciate from this disclosure that the third plate 62 can be integrated with any of the anti-theft devices 10–14 of the present invention.

Figure 13:
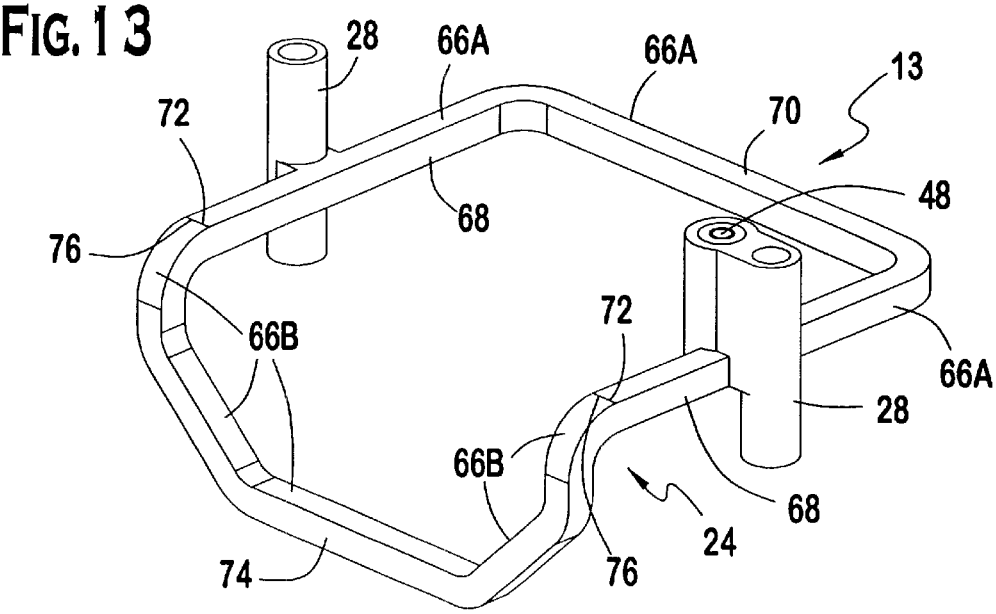
FIG. 13 is a perspective view of a fourth preferred embodiment of an anti-theft device according to the present invention.

Referring to FIGS. 13 and 14, the bracing member 24 of the fourth preferred embodiment of the anti-theft device 13 can be formed using a first and second plurality of frame members 66A, 66B. The first plurality of frame members 66A includes a set of generally parallel tubes 68 with a single transverse tube 70 connecting the first set of generally parallel tubes 68 which are adapted to cover the portion of the steering column 18 and a first portion of the hub 22.

While the single transverse tube directly connects the set of generally parallel tubes 68, further connections in addition to the single transverse tube 70 can be used without departing from the scope of the present invention or claims. Thus, the recitation of the term "single transverse tube" in the claims does not mean that additional linkage connections in addition to the single transverse tube 70 that directly extends between the set of generally parallel tubes 68 are outside of the scope of the claimed invention. The set of generally parallel tubes 68 each has an end 72 positioned proximate to the first portion of the hub 22. It is preferred that the set of generally parallel tubes 68 include a tube 28 which defines a chute for receiving the at least one connecting part 30 within the tube 28.

The second plurality of frame members 66B are positioned end-to-end to form a single hub linkage 74. The single hub linkage 74 has two linkage ends 76 each located on a separate one of the end 72 of the set of parallel tubes 68. The single hub linkage 74 is positionable to cover a second portion of the hub 22 along the front side of the steering wheel 16. The separate recitation of first and second pluralities of frame members 66A, 66B in the claims and specification is for purposes of clarity with respect to geometry and orientation and does not imply that the bracing member 24 cannot be formed as a single piece while remaining within the scope of the claims. Accordingly, the terms "first and second pluralities of frame members" is defined as including a solid piece of material including multiple frame members or tubes.

Referring to FIG. 6, one embodiment of the present invention operates as follows. A bracing member 24 is positioned over a portion of the steering column 18 and the hub 22 of the steering wheel 16. When the bracing member 24 is properly positioned the first plate 26A is positioned over the top portion of the steering column and the hub 22 and the second plate 26B is positioned along the front portion of the hub 22. Once the bracing member 24 is properly positioned, a column engaging member 32 is positioned over the steering column with the connecting parts 30 inserted into the tubes 28 located on the bracing member 24. Referring to FIG. 5, when the ratchets 50 on at least one connecting part 30 of the column engaging member 32 abut the sliding lock mechanism 56, the sliding lock mechanism 56 is displaced allowing the column engaging member 32 to be fully inserted against the steering column 18. The biasing member 58 prevents the column engaging member 32 from being withdrawable from the bracing member 24 without activating the locking mechanism using a key or thumb print or the like. Once the bracing member 24 and the column engaging member 32 are properly positioned over the steering wheel 16 and the steering column 18, the two components are pressed together to secure the anti-theft device 10 in position. Once in position, a thief or other unauthorized vehicle user can no longer operate the steering wheel 16 due to the engagement (or proximity) of the first plate 26A with the top of the steering column 18. Those of ordinary skill in the art will appreciate that depending on the orientation and configuration of the steering wheel, the anti-theft device 10–14 can be installed with the bracing member 24 positioned on the top, bottom, left side, or right side of the steering column 18 without departing from the scope of the present invention.

This invention provides a highly compact, sturdy, easy to store, quick assembly vehicle security device that is also capable of protecting an air bag if so desired. It is recognized by those skilled in the art, that changes may be made to the above described embodiments of the invention without departing from the broad inventive concept thereof. It is understood, therefore, that this invention is not limited to the particular embodiments disclosed, but is intended to cover all modifications which are within the spirit and scope of the invention as defined by the appended claims.

I claim:

1. An anti-theft device for securing a steering wheel of a vehicle, the steering wheel being rotatably mounted on a steering column, the steering wheel having a hub and a front side, facing generally away from the steering column, the anti-theft device comprising:

at least one bracing member adapted to be positioned over a portion of the steering column and over a portion of the steering wheel, the at least one bracing member including first and second plates, the first plate being adapted to cover the portion of the steering column and a first portion of the hub, the second plate being located along the first plate and being adapted to cover a second portion of the hub along the front side of the steering wheel;

a column engaging member removably slidably positionable over the steering column, the column engaging member being detachably engageable with the first plate to, in combination with the first plate, form a linkage adapted to substantially surround the steering column in an installed configuration; and a locking mechanism adapted to detachably lock the anti-theft device in the installed configuration.

2. The anti-theft device of claim 1, further comprising a third plate located on the first plate and adapted to extend generally perpendicularly therefrom to cover an ignition key receptacle.

3. The anti-theft device of claim 1, wherein the second plate has a generally rectangular shape.

4. The anti-theft device of claim 1, wherein the column engaging member comprises:

at least one connecting part adapted to be detachably securable to the first plate; and a transverse part adapted to overlay a portion of the steering column generally opposite from the first plate.

5. The anti-theft device of claim 4, wherein the first plate includes a tube defining a chute for receiving the at least one connecting part within the tube, the locking mechanism being disposed proximate to the tube to detachably secure the connecting part within the tube.

6. The anti-theft device of claim 5, wherein the first plate is curved to complement the portion of the outer surface of the steering column covered thereby.

7. The anti-theft device of claim 5, wherein the second plate is hinged to the first plate such that the first and second plates can be placed in a storage position with the first and second plates each having a separate major surface adjacent to each other.

8. The anti-theft device of claim 7, further comprising the first and second plates being connected by a rotation limiting hinge that prevents the second plate from being rotated from the storage position through an arc of more than about ninety (90) degrees.

9. The anti-theft device of claim 8, further comprising a third plate located on the first plate and adapted to extend generally perpendicularly therefrom to cover an ignition key receptacle.

10. The anti-theft device of claim 9, wherein the rotation limiting hinge includes a torsion spring biasing the second plate into the storage position.

11. The anti-theft device of claim 5, wherein the column engaging member has two connecting parts, such that the linkage is adapted to completely surround the steering column.

12. The anti-theft device of claim 11, wherein the column engaging member is U-shaped.

13. An anti-theft device for securing a steering wheel of a vehicle, the steering wheel being rotatably mounted on a steering column, the steering wheel having a hub and a front side, facing generally away from the steering column, the anti-theft device comprising:

at least one bracing member adapted to be positioned over a portion of the steering column and over a portion of the steering wheel the at least one bracing member including first and second pluralities of frame members, the first plurality of frame members including a set of generally parallel tubes with at least one transverse tube connecting the first set of generally parallel tubes which are adapted to cover the portion of the steering column and a first portion of the hub, the set of generally parallel tubes each having an end positioned proximate to the first portion of the hub, the second plurality of frame members being positioned end-to-end to form a single hub linkage, the single hub linkage having two linkage ends each located on a separate one of the ends of the set of parallel tubes, the single hub linkage being positionable to cover a second portion of the hub along the front side of the steering wheel;

column engaging member detachably engageable with the first set of generally parallel tubes to, in combination with the first plurality of frame members, form a linkage adapted to substantially surround the steering column in an installed configuration; and a locking mechanism adapted to detachably lock the anti-theft device in the installed configuration.

14. The anti-theft device of claim 13, wherein the at least one bracing member forms a generally L-shaped member.

15. The anti-theft device of claim 13, wherein the column engaging member comprises:

at least one connecting part adapted to be detachably securable to one of the set of generally parallel tubes; and a transverse part adapted to overlay a portion of the steering column generally opposite from the set of generally parallel tubes.

16. The anti-theft device of claim 15, wherein the set of generally parallel tubes includes a tube defining a chute for receiving the at least one connecting part within the tube, the locking device being disposed proximate to the tube to detachably secure the connecting part within the chute.

17. The anti-theft device of claim 15, wherein the column engaging member has two connecting parts, such that the linkage is adapted to completely surround the steering column.

18. A combination anti-theft device and steering wheel of a vehicle, the steering wheel being rotatably mounted on a steering column, the anti-theft device being adapted to detachably secure the steering wheel, the steering wheel having a hub and a front side, facing generally away from the steering column, the combination comprising:

the steering wheel and the steering column;

at least one bracing member detachably positioned over a portion of the steering column and over a portion of the steering wheel, the at least one bracing member including first and second plates, the first plate being positionable to cover the portion of the steering column and a first portion of the hub, the second plate being located along the first plate and being positionable to cover a second portion of the hub along the front side of the steering wheel;

a column engaging member removably slidably positionable over the steering column, the column engaging member being detachably engageable with the first plate to, in combination with the first plate, form a linkage adapted to substantially surround the steering column in an installed configuration; and a locking mechanism adapted to detachably lock the anti-theft device in the installed configuration.

19. The combination of claim 18, further comprising a third plate located on the first plate and adapted to extend generally perpendicularly therefrom to cover an ignition key receptacle.

20. A combination anti-theft device and steering wheel of a vehicle, the steering wheel being rotatably mounted on a steering column, the anti-theft device being adapted to secure the steering wheel the steering wheel having a hub and a front side, facing generally away from the steering column, the combination comprising:

the steering wheel and the steering column;

at least one bracing member positionable over a portion of the steering column and over a portion of the steering wheel, the at least one bracing member including first and second pluralities of frame members, the first plurality of frame members including a set of generally parallel tubes with at least one transverse tube connecting the first set of generally parallel tubes which are positionable to cover the portion of the steering column and a first portion of the hub, the set of generally parallel tubes each having an end positioned proximate to the first portion of the hub, the second plurality of frame members being positioned end-to-end to form a single hub linkage, the single hub linkage having two linkage ends each located on a separate one of the ends of the set of parallel tubes, the single hub linkage being positionable to cover a second portion of the hub along the front side of the steering wheel;

a column engaging member detachably engageable with the first set of generally parallel tubes to, in combination with the first plurality of frame members, form a linkage adapted to substantially surround the steering column in an installed configuration; and a locking mechanism adapted to detachably lock the anti-theft device in the installed configuration.

21. The combination of claim 20, further comprising a third plate located on one of the set of generally parallel tubes and adapted to extend generally perpendicularly therefrom to cover an ignition key receptacle.

22. An anti-theft device for securing a steering wheel of a vehicle, the steering wheel being rotatably mounted on a steering column, the steering wheel having a hub and a front side, facing generally away from the steering column, the anti-theft device comprising:

at least one bracing member adapted to be positioned over a portion of the steering column and over a portion of the steering wheel the at least one bracing member including first and second plates, the first plate being adapted to cover the portion of the steering column and a first portion of the hub, the first plate detaining a first generally planar two dimensional array of potential contact points for the portion of the steering column and the first portion of the hub, the second plate being located along he first plate and being adapted to cover a second portion of the hub along the front side of the steering wheel the second plate defining a second generally planar two dimensional array of potential contact points for the second portion of the hub;

a column engaging member detachably engageable with the first plate to, in combination with the first plate, form a linkage adapted to substantially surround the steering column in an installed configuration; and a locking mechanism adapted to detachably lock the anti-theft device in the installed configuration.

23. The anti-theft device of claim 22, wherein the column engaging member is removably slidably positionable over the steering column.

* * * * *